(12) United States Patent
Stone

(10) Patent No.: US 11,150,759 B2
(45) Date of Patent: Oct. 19, 2021

(54) BOOK

(71) Applicant: Novalia Ltd., Cambridge (GB)

(72) Inventor: Kate Stone, Cambridge (GB)

(73) Assignee: Novalia Ltd.

( * ) Notice: Subject to any disclaimer, the term of this patent is extended or adjusted under 35 U.S.C. 154(b) by 0 days.

(21) Appl. No.: 16/861,976

(22) Filed: Apr. 29, 2020

(65) Prior Publication Data
US 2020/0387348 A1 Dec. 10, 2020

Related U.S. Application Data

(63) Continuation of application No. 16/022,844, filed on Jun. 29, 2018, now abandoned, which is a continuation of application No. 14/434,422, filed as application No. PCT/GB2013/052613 on Oct. 8, 2013, now abandoned.

(30) Foreign Application Priority Data

Oct. 9, 2012 (GB) ...................................... 1218068

(51) Int. Cl.
G06F 3/041 (2006.01)
G09B 5/06 (2006.01)
A63H 33/38 (2006.01)
B42D 3/12 (2006.01)
G06F 3/044 (2006.01)
G06F 3/16 (2006.01)

(52) U.S. Cl.
CPC ............ G06F 3/0416 (2013.01); A63H 33/38 (2013.01); B42D 3/123 (2013.01); G06F 3/044 (2013.01); G06F 3/0446 (2019.05); G06F 3/167 (2013.01); G09B 5/06 (2013.01); G09B 5/062 (2013.01)

(58) Field of Classification Search
CPC ...... G06F 3/044; G06F 3/0483; G06F 3/0416; G06F 3/041; G06F 3/167; B42D 3/123; A63H 33/38; G09B 5/062; G09B 5/06
See application file for complete search history.

(56) References Cited

U.S. PATENT DOCUMENTS

| 7,621,441 B1* | 11/2009 | Milford | G06K 7/081 |
| | | | 235/375 |
| 9,355,568 B2* | 5/2016 | Stone | G09B 5/00 |
| 2007/0298398 A1* | 12/2007 | Smirnov | A63H 33/38 |
| | | | 434/309 |

* cited by examiner

Primary Examiner — Amare Mengistu
Assistant Examiner — Cory A Almeida
(74) Attorney, Agent, or Firm — Ware, Fressola, Maguire & Barber LLP

(57) ABSTRACT

A book (1) is described. The book has front and back covers (2, 3) and a plurality of pages (5) bound between the covers. The book includes capacitive touch elements (9) disposed on the inside (10, 14) of the back cover and/or the front cover. The book also includes at least one output device (7), such as a speaker, and a controller (18). The controller is configured to cause the or at least one of the output devices to output a signal in dependence upon position of a user's digit (31: FIG. 6) on a page overlying the cover.

12 Claims, 10 Drawing Sheets

BOOK

FIELD OF THE INVENTION

The present invention relates to a book.

BACKGROUND

Electronic printed books, i.e. printed books which include electronic devices, are known.

WO 94 12963 A describes an electronic book comprising a plurality of leaves. Each leaf comprises pages of printed material bound at one edge to form a spine with electrical circuits formed in each leaf. A common electronic circuit, such as a speech generator and/or controller, cooperates with the electrical circuits on each of the various pages, connected to the electrical circuits in the leaves through conductive paths through the spine of the book. The electrical circuits in the leaves include electrical elements, such as switches, and sensory output devices, such as light emitting diodes.

DE 10 2008 039 859 A describes a multi-function book having printed text for reading and additional audio-visual effects, which can be activated at the book or remotely. The effects can be located in the book covers or pages, powered by low-energy batteries in the spine. The effects may include light emitting diodes, projection, sound loudspeakers or odour dispensers.

GB 2 453 969 A describes an audio book built into the spine or cover of the book. This allows the user to listen to an audio version of the book.

GB 2 462289 A describes a book comprising at least two pages, each page comprising a laminate of at least two sheet portions. The book also comprises a printed circuit sheet comprising a substrate and conductive tracks disposed on the substrate. The printed circuit sheet has first and second portions and at least some of the conductive tracks run from the first to the second portion of the printed circuit sheet. The second portion of the printed circuit sheet comprises at least two fingers. Each finger supports at least one electronic device for providing user input and/or output and wherein each finger is inserted into a respective page in between sheet portions. This allows a circuit can be incorporated into the book.

SUMMARY

The present invention seeks to provide an improved book.

According to a first aspect of the present invention there is provided a book. The book comprises front and back covers and a plurality of pages between the covers. The book includes capacitive touch elements disposed on the inside of a cover (for example the back cover) and at least one output device (such as a loudspeaker). The book also includes a controller. The controller is operatively connected to the array and the output device(s). The controller is configured to cause the output device or at least one of the output devices to output a signal in dependence upon position of a user's digit on a page overlying the cover. The position is detected by the capacitive touch elements.

This allows the book to become interactive without the need to embed switches or sensors into the pages. Thus, a user can touch a word or picture of, for example, an animal or object, or trace their finger along a sentence or through a picture. This action can be detected by the capacitive touch elements and cause the output device to output a corresponding signal (e.g. sound), such as the word or noise, the sentence or composite noise.

The term "book" is intended to include any book-like printed matter including a booklet, notebook, exercise book etc. The pages may be fixed (or "bound") between the covers. Thus, the book may be a typical paperback or hardback book. The pages may be replaceable (or "loose leaf"). Thus, the book may be a ring binder or other form of file having a temporary paper-retaining mechanism.

The book can be a children's book. The book may include images, such as line art, colour pictures, and/or photos. The book may include a significant number of images and few words, i.e. be a picture book. The book may include musical notation.

The capacitive touch elements may be arranged in an array. The array of capacitive touch elements may provide a capacitive touchpad.

The controller may be configured to cause the or at least one of the output devices to output a signal in dependence upon a gesture, such a single or double tap, or long hold.

The book may comprise a first set of capacitive touch elements disposed on the inside of the back cover for detecting manipulation of a front side of a page and a second set of capacitive touch elements disposed on the inside of the front cover for detecting manipulation of a back side of a page. Thus, touching either side of the page can cause the output device (or at least one output device) to output a signal.

The at least one output device may include a speaker. The speaker may be piezoelectric speaker or other form of low-profile speaker. Thus, the signal can be speech and/or other form of sound. The at least one output device may include an interface for outputting an audio signal. The interface may be a wireless interface, such as Bluetooth transmitter or transceiver. Thus, sound or image can be transmitted to a remote device, such as headset, mobile communication device (for example, a smart phone), computer (for example, a tablet computer), television set or smart board.

The controller may be configured to cause the output device to output an audio signal. The controller may be configured, in response to determining that a user's digit rests at given position, to output a first audio signal of relatively short duration. The first audio signal may carry a word, phase or sentence. The first audio signal may carry a non-verbal sound, such as an animal noise (for example, a dog's bark or cow's moo), the noise of an object (for example, a car) or the sound of a musical instrument (such as a piano). The controller may be configured, in response to the user continuing to rest at the given position, to repeat the first audio signal of relatively short duration.

The controller may be configured, in response to determining that a user digit traces a path, to output a second audio signal of relatively long duration. The second audio signal may carry a sentence.

According to a second aspect of the present invention there is provided a method comprising receiving signals indicative of position of a user's digit on a page of book and causing at least one output device to output a signal in dependence upon the position of the user's digit on a page overlying the cover. The method may comprise identifying the page, for example, by measuring signal strength. The method may be performed by a microcontroller.

According to a third aspect of the present invention there is provided a computer program which, when executed by a playback device comprising an output device, causes the playback device to perform the method.

According to a fourth aspect of the present invention there is provided a computer readable medium storing the computer program.

BRIEF DESCRIPTION OF THE DRAWINGS

Certain embodiments of the present invention will now be described, by way of example, with reference the accompanying drawings, in which.

DETAILED DESCRIPTION OF CERTAIN EMBODIMENTS

Figure 1:
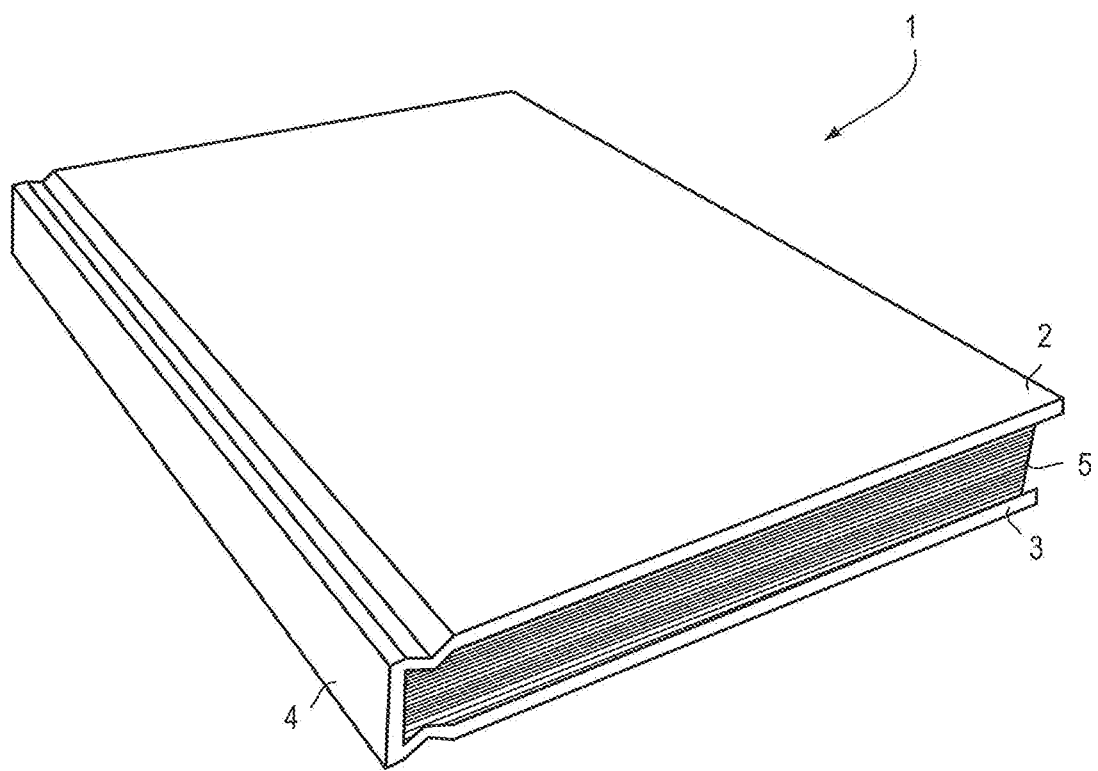
FIG. 1 is a perspective view of a book.
Figure 2:
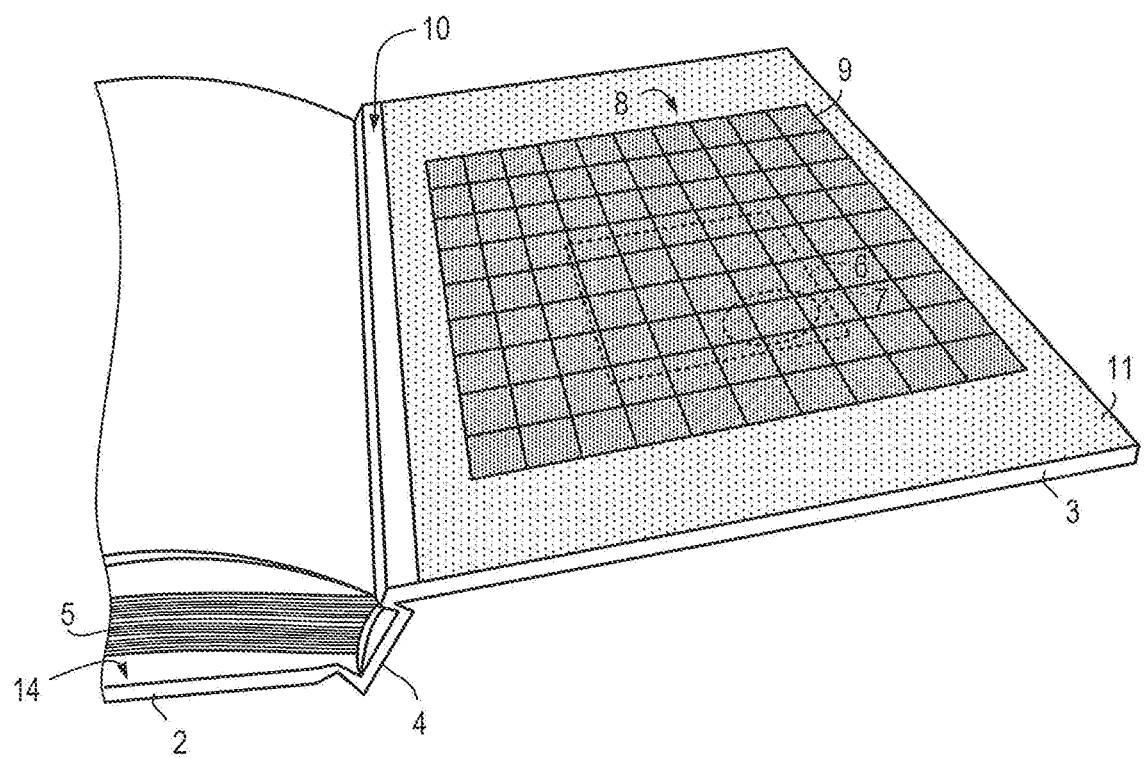
FIG. 2 is a perspective view of the inside of a back cover of the book shown in FIG. 1.

Referring to FIGS. 1 and 2, a printed book 1 is shown.

The printed book 1 is in the form of a hardcover (also known as a "hardback" or "hardbound") book having rigid front and back covers 2, 3 and a spine 4. The book 1 contains a plurality of leaves (or "pages") 5 bound between the covers 2, 3.

Referring in particular to FIG. 2, a playback device 6 (which may also be referred to as a "feedback device" or "rendering device") is housed in the back cover 3 for providing audio and/or visual content via an output device 7 in the form of a piezoelectric speaker. In this example, the playback device 6 is incorporated only into the back cover 3. However, the playback device 6 may be built into the front cover 2 or into the spine 4, or may be distributed between two or all three of the front cover 2, back cover 3 and spine 4.

The cover or spine has a thickness of at least 3 mm and may have a thickness of between 3 and 5 mm or more than 5 mm. Thus, the cover is sufficiently thick to accommodate the playback device 6.

To reduce the thickness of the playback device, the components (such as integrated circuits) comprised in the playback device 6 need not be mounted on a conventional printed circuit board or printed wiring board. Instead, the components may be mounted directly onto conductive tracks printed or formed on a part of the book, such as a cover or sheet, using conductive glues or inks.

The playback device 6 is controlled by an array 8 of capacitive touch elements 9 disposed on the inside face 10 of the back cover 3. The capacitive touch elements 9 are formed on a sheet 11.

The array 8 may be configured to provide a touchpad, for example, similar to that described in U.S. Pat. No. 6,188,391 B1 or WO 2011/023856 A1. The array 8 may comprise, for example, an array of (m×n) elements 9, for example where $2 \leq m \leq 20$ and $2 \leq n \leq 20$. Each element 9 may have an area, A, of $20 \text{ mm}^2 \leq A \leq 400 \text{ mm}^2$. The capacitive touch elements 9 need not be arranged in a rectangular array. The elements 8 are shown as being rectangular. However, the elements 8 may be lozenge shaped.

An array or touchpad arrangement of elements 9 need not be used. The capacitive touch elements 9 may be arranged in a non-periodic pattern. The capacitive touch elements 9 need not have the same area, A, and/or shape. The capacitive touch elements 8 can be spaced by gaps (or "non-sensing regions") (not shown). A gap (not shown) between two elements 8 may have a length of at least 5 mm, at least 10 mm or at least 20 mm.

The capacitive touch elements 9 cover or are spread over an area which is about the same of as the area of an overlying page 5. Thus, the capacitive touch elements 9 can sense user touch across the whole page. One or more capacitive touch elements 9 may be placed and/or extend outside the edges of a page 5. This can be used to provide a universal (i.e. page-independent) control panel.

The playback device 6 may be controlled by two sets 8, 12 (FIG. 4) of capacitive touch elements 9, 13 (FIG. 4), namely a first set 8 disposed on the inside face 10 of the back cover 3 and a second set 12 (FIG. 3) of capacitive touch elements 13 (FIG. 4) disposed in the inside face 14 of the front cover 2. The capacitive touch elements 13 on the front cover 2 can be positioned and shaped in a similar way to the capacitive touch elements 12 on the front cover 2.

The capacitive touch elements 8 and connecting tracks (not shown) may comprise conductive ink, such as a silver-based conductive ink printed on a sheet. Suitable conductive inks are available from Sun Chemical Corporation, Parsippany, N.J., USA. Other forms of conductive ink can be used, such as a copper-based conductive ink or some other metallic-based conductive ink, or a carbon-based conductive ink. The elements 9 and tracks (not shown) may be formed using a printing process, such as screen printing, ink jet printing, flexography or offset printing.

Conductive tracks and elements can be used for connecting capacitive touch elements to the playback device 6.

If conductive elements 13 (and/or at least a part of the playback device 6) are disposed in the front cover 2, then a ribbon-like flexible printed circuit sheet (or "flex connector") (not shown) passing between the front and back covers 2, 3 through or behind the spine 4 can be used to connect the capacitive touch elements 13 (or playback device 6) in the front cover 2 to the (rest of) playback device 6.

Figure 3:
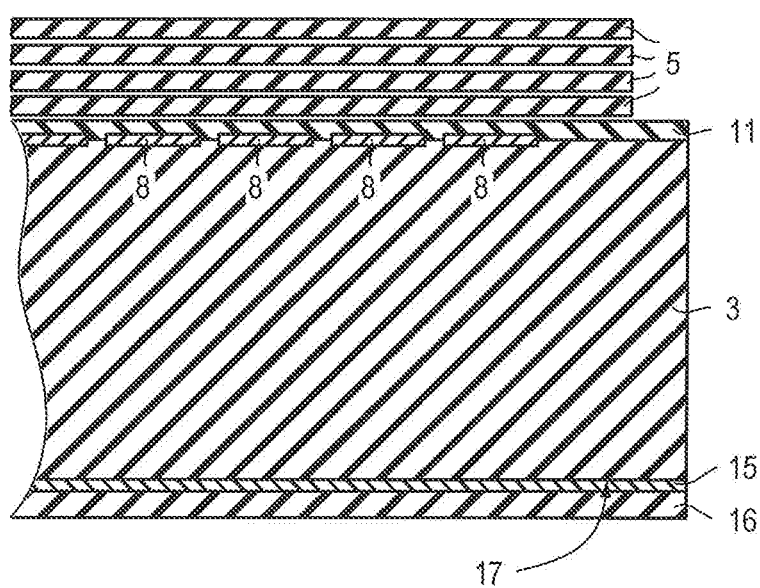
FIG. 3 is a cross-sectional view through some pages and the back cover of the book shown in FIG. 1.

Referring to FIG. 3, the capacitive touch elements 9 may be protected by placing the sheet 11 face down onto the back cover 3. This can also help facilitate connection of the capacitive touch elements 9 to the playback device 6 (FIG. 4) which is embedded in a recess (now shown) in the cover 4 since connections passing from one side of the sheet to the other is not required. It can also help to hide the presence of the capacitive touch elements from the user. Additionally or alternatively, a sheet of paper or card (not shown) may be glued onto sheet 11. The same or similar arrangements can be used for capacitive touch elements 13 in the front cover 2.

A conductive sheet or mesh 15 may be provided on the outside 16 of the back cover 3. The conductive sheet or mesh 15 can take the form of a sheet or fine mesh of conductive ink printed on a sheet 16 of paper, card or plastic which is glued on the outside 17 of the cover 3 or embedded in the cover 3 close to the outside face 17. Such a conductive sheet or mesh provides an electrostatic shield which can help to reduce unintentional activation of the capacitive touch elements 8. The same or similar arrangement can be used for the front cover 2 regardless of whether or not capacitive touch elements 13 are used in the front cover 2. A similar layer can also be included in the spine.

Figure 4:
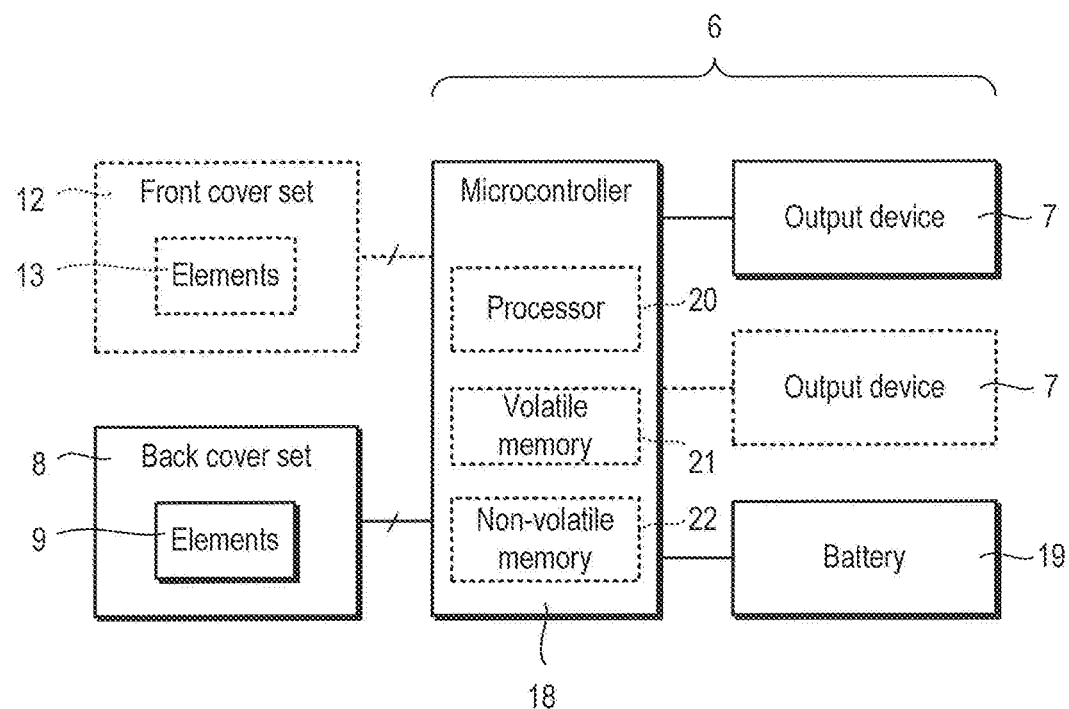
FIG. 4 is a schematic block diagram of capacitive touch elements and a playback device incorporated into the book shown in FIG. 1.

Referring to FIG. 4, the playback device 6 includes at least one output device 7, a microcontroller 18 and a battery 19. The battery 19 is low profile having a thickness of less than 2 mm. For example, the battery 19 may take the form of a lithium polymer battery having a thickness of 1 mm. As explained earlier, the output device 7 or at least one of the output devices 7 takes the form of a speaker, in particular a piezoelectric speaker. Other low-profile form of speaker can be used. In some embodiments, for example, where sound is output by a remote device or sound is not required, a speaker need not be used. Other output devices 7 may be provided. For example, a wireless interface, such as Bluetooth® transmitter or transceiver may be used to transmit a signal to a remote device. Light emitting diode(s) and/or visual display may be provided.

The microcontroller 18 includes a processor 20, memory 21 and non-volatile memory 22. The non-volatile memory 22 stores software 23 for controlling how the book responds to user input, look up table(s) 24 for interpreting user input and content data 25, for example, audio files. The microcontroller 18 may be a PIC® microcontroller available from Microchip Technology Inc., Chandler, Ariz., USA. Some discrete components, such as resistors and capacitors, are not shown.

The components 7, 18, 19 may be mounted onto a printed circuit board (not shown). Wires or flex connector board (not shown) may connect the printed circuit board (not shown) to the capacitive touch elements 9, 13. However, as explained earlier, the components 7, 18, 19 may be mounted directly onto a sheet (such as paper or card) or even onto the same sheet 11 (FIG. 3) which supports capacitive the touch elements 9.

Landing pads and conductive tracks may be formed of conductive ink or foil. Conductive glue or conductive tape may be used to mount the components to the pads and tracks.

Referring again to FIGS. 2 and 3, the book 5 contains N pages 5 formed from paper, card or other fibre-based material, or plastic. Each page 5 has a thickness, t. When stacked flat, all the pages 5 have a total thickness, T, where T=N×t.

The total thickness, T, of the pages 5 is preferably no more than 10 mm and more preferably no more than 5 mm. Thus, if the pages 5 comprise paper having a weight of 80 gm$^{-2}$ (corresponding to a thickness of about 100 µm), then N is preferably no more than 100 and more preferably no more than 50. If the pages 5 comprise card having a weight of 240 gm$^{-2}$ (corresponding to a thickness of 300 µm), then N is preferably no more than 33 and more preferably no more than 16. In the case of board books whose pages may have a thickness of about 1 mm, the book may have less than 10 pages and may even have less than 5 pages.

The pages 5 are sufficiently thin that even when the user places their finger on top of a stack of all the pages 5 in the book and which are lying flat on top of the back cover 3 (or on top of the front cover 2), the capacitive touch elements 8 (capacitive touch elements 12) are still able to detect the presence of user's finger through the pages.

By placing capacitive touch elements in the back and/or front covers 2, 3 and embedding a playback device 6 in the book 1, the book 1 can become interactive. For example, when the user touches a page, the book 1 can respond by uttering a word or sentence, or making a sound.

Figure 5:
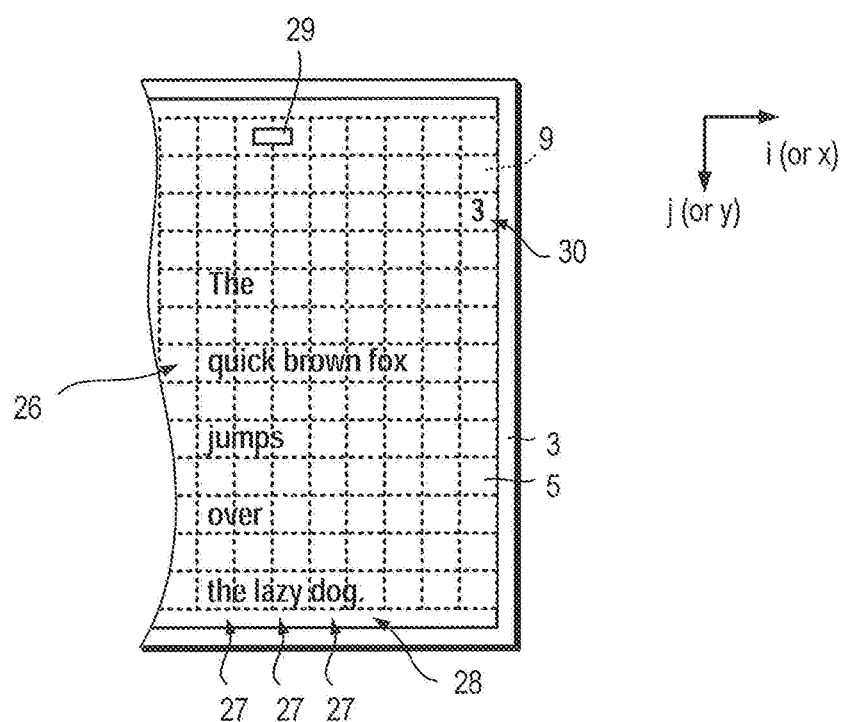
FIG. 5 illustrates a page with text and an underlying array of capacitive touch elements.

FIG. 5 shows a page 5 on which text 26 is printed. Other forms of indicia (such as pictures) may be printed on the page 5. The page 5 is one of several pages 5. In this example, the page 5 is the third page of ten pages. Thus, seven pages lie between the page 5 and the back cover 3. The page 5 may be any page in the book. In this example, the text 26 includes words 27 which form a sentence 28. However, complete sentences need not be used.

The controller 18 determines where on the page 5 the user touches by detecting which elements 8 are actuated. For example, a capacitive touchpad 8 can be used to determine a position (i, j) or (x, y) which can be converted by means of a look-up table 24 for a given page 5 to identify a word 27.

The controller 18 can determine which page 5 is being touched in one or more ways.

Each page 5 may carry a conductive pad, strip or pattern 29 which is located in a unique position with respect to the capacitive touch elements 9. The conductive pad, strip or pattern 29 may be transparent or hidden under print and, thus, be imperceptible to the user's eye.

When all the pages 5 are stacked, the capacitive touch elements 9 are coupled via an aggregate pattern of conductive regions and so detect the pattern. After the top page 5 is turned (thereby leaving a smaller stack of pages 5), the capacitive touch elements 9 detect another, different pattern (i.e. less one region which was provided by the top page). After the next page 5 is turned, the capacitive touch elements 9 detect yet another different pattern and so on. Thus, if there are N pages, then N patterns can be used to encode N pages.

Another way to detect the page may involve user input. The user (after turning a page and before starting to read) can touch a page number 30 which is located in a unique position, i.e. page number one is located in one position, page two is located in another different position and so on. This can have the advantage that conductive ink need not be printed on pages 5.

The page can be inferred from signal strength. For example, touching the first page 5 (furthest from the back cover 3) will result in a weaker signal at the back cover 3 than touching the last page 5 (closest to the back cover 3). The book 1 may instruct the user to touch different pages before using the book in order to calibrate signal strengths.

Finally, text on different pages 5 may be located in different positions. Thus, each word (or image) is uniquely locatable using capacitive touch elements 9. In effect, no distinction between pages is made.

Other methods of measuring or inferring page number may be used.

Figure 6:
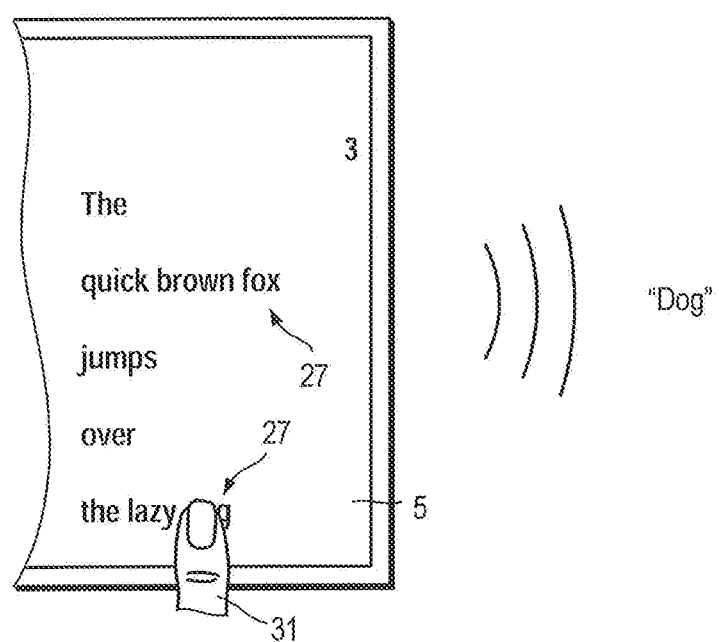
FIG. 6 illustrates output of a word when a user touches the word on a page.

Examples of using the book 1 will now briefly be described:

Referring to FIG. 6, using their finger 31, a user can touch a word 27, such as "dog", on the page 5 and the controller 18 (FIG. 4), in response to receiving a signal from a given element or elements 9 (FIG. 4), causes the speaker 7 (FIG. 4) to output the word "dog". Touching a different word results in a different output. For example, touching the word "fox" results in the output of the word "fox".

The book 1 need not output speech, but can output non-verbal sound. For example, touching the word "dog" can cause output of the sound of a dog bark.

The book 1 may include pictures and touching a picture can result in the output of a sound. For example, the book 1 may include a picture of dog and touching the picture can cause output of the word "dog" or the sound of a dog bark.

Figure 7:
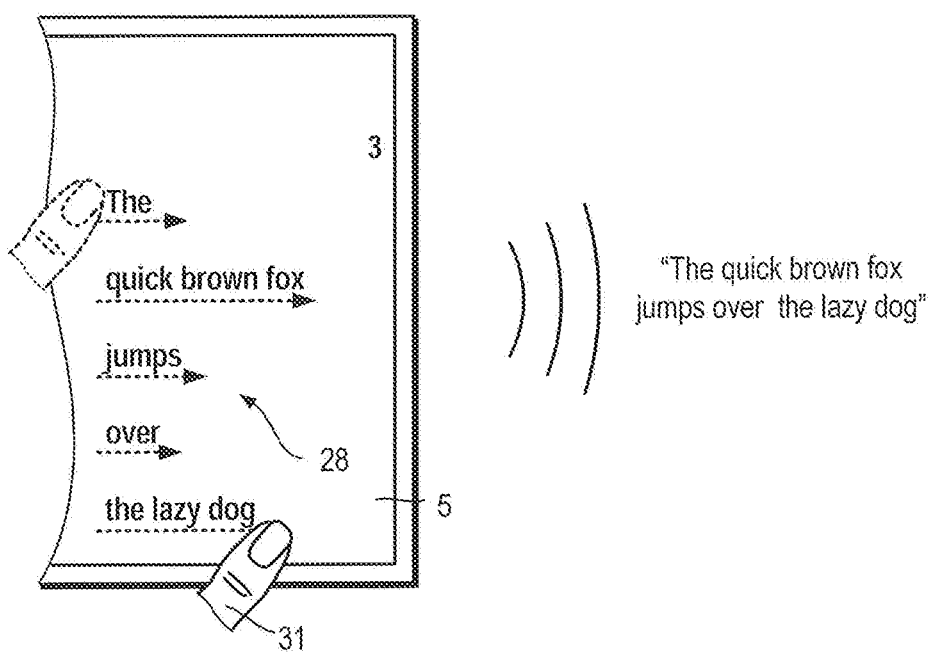
FIG. 7 illustrates output of a sentence when a user traces their finger along the sentence.

Referring to FIG. 7, a user trace their finger 31 along a sentence 28, such as "The quick brown fox jumps over the lazy dog" and the controller 18 (FIG. 4), in response to receiving a set or train of signals from capacitive touch elements 9, causes the speaker 7 (FIG. 4) to output the sentence "The quick brown fox jumps over the lazy dog".

Figure 8:
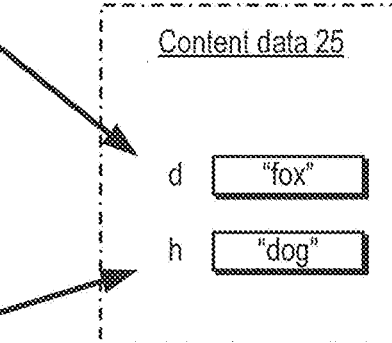
FIG. 8 is a schematic diagram of a look-up table.
Figure 9:
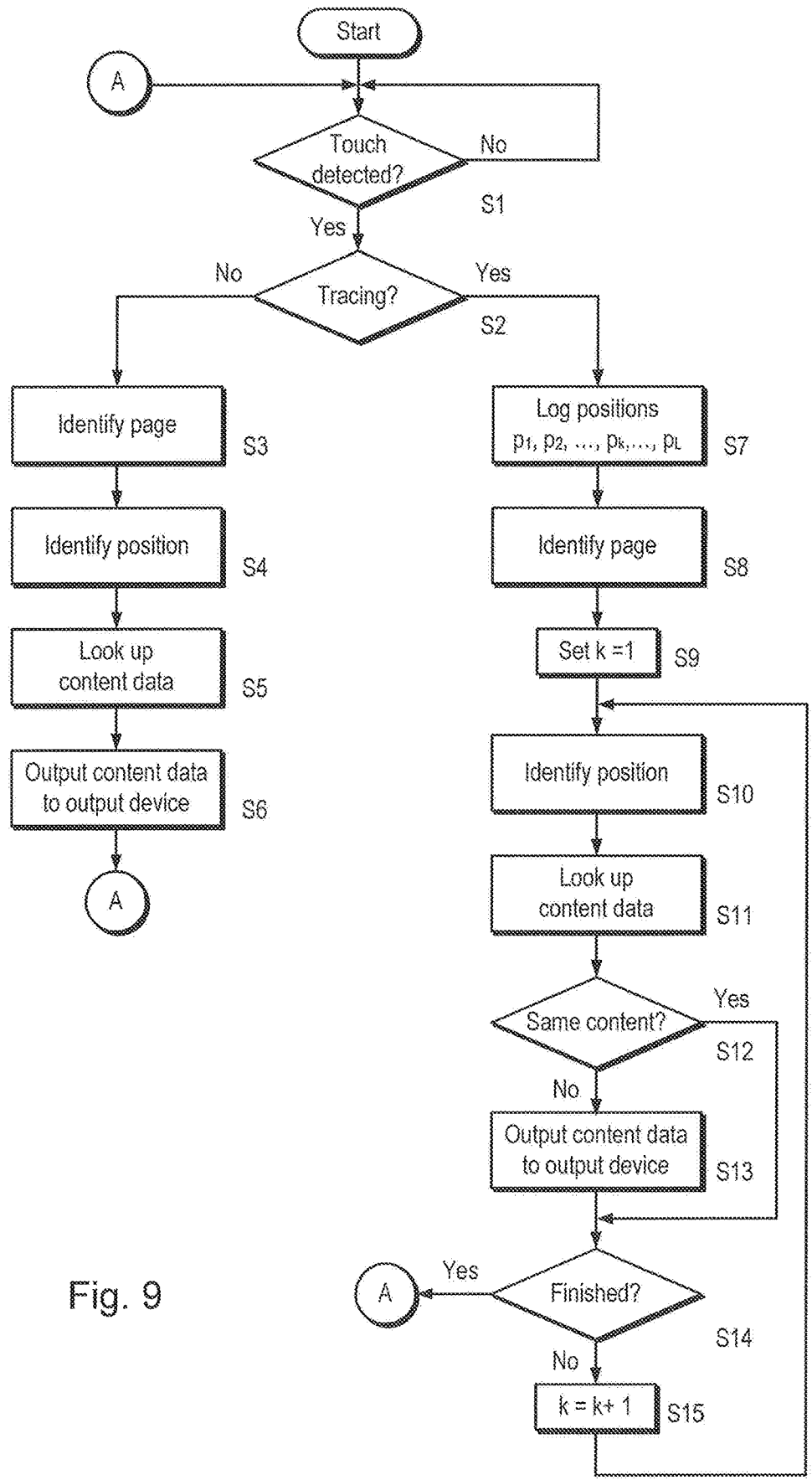
FIG. 9 is a process flow diagram performed by a microcontroller.

Referring to FIG. 8, a look up table 24 is shown.

Figure 4A:
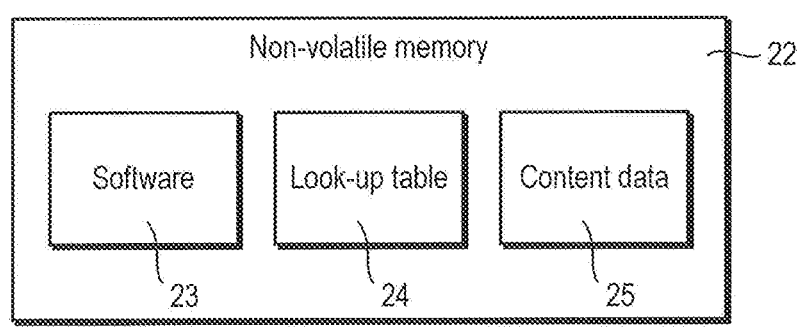
FIG. 4a is schematic block diagram of non-volatile memory.

The table 24 includes a set of entries 32. Each entry 32 includes a field 33 identifying the page 5, fields 34, 35 for identifying the position on the page and a field 36 including a pointer to an address in memory containing appropriate content data 25 (FIG. 4a).

Referring to FIGS. 4 to 9, operation of the controller 18 will now be described:

The controller 18 monitors the voltage on each line (not shown) from the capacitive touch elements 9, 13 (step S1). If it detects a change in voltage(s), then the controller 18 waits to determine whether voltage(s) in other lines (not shown) also change thereby indicating that the user's finger is moving (step S2).

If the controller 18 determines that the user's finger is stationary, then it identifies the page and position (steps S3 & S4). Using the look-up table 28, the controller 18 retrieves content data 29 and passes the data to output device 7 for outputting (step S6).

Having completed playback, the controller 18 starts again to monitor the voltage on each line (not shown) from the capacitive touch elements 9, 13 (step S1).

If the controller 18 determines that the user's finger is moving, then it logs successive changes in position, i.e. $p_1$, $p_2, \ldots, p_k, \ldots, p_L$ (step S7).

The controller 18 can start to process the data while it still records positions. The controller 18 identifies the page (step S8) and, starting with the first position (i.e. $p_1$), it identifies position (steps S9 & S10). Using the look-up table 28, the controller 18 retrieves content data 25 (step S11). The controller 19 may check whether the same content data has already been read out and, if the same content data has already been read out, the controller may skip outputting the same content data to the output device (step S12). This can help prevent the same word from being repeated, particularly if the word is long and runs over several elements. If the content data has not been output immediately beforehand, then the controller 18 retrieves the content data 25 and passes the data to output device 7 for outputting (step S13).

The controller 18 checks whether all data associated with the user's path has been read out, i.e. checking whether $p=p_L$ (step S14). If not, the controller 18 moves onto the next position (i.e. $p_{k+1}$) (step S15) and continues to process position data and output content data for playback (steps S9 to S13).

Having completed playback or a sentence, the controller 18 starts again to monitor the voltage on each line (not shown) from the capacitive touch elements 9, 13 (step S1).

It will be appreciated that more sophisticated processes may be used which leads to quicker or smoother playback. Furthermore, more complex gestures may be detected, such as single and double taps, long holds and swipes.

The book 1 need not always respond in the same way. For example, touching a word or picture on one page may depend on whether a word or picture on a previous page was pressed as described in GB 2464537 A.

As explained earlier, the book 1 may include a single set of capacitive touch sensing elements, for example in the form of a touchpad, in either the front or back cover. Furthermore, the book 1 may include two sets of capacitive touch sensing elements, for example each in the form of a touchpad, one in the cover and another in the back cover. However, this requires connection between the front and back covers over the spine.

Figure 10:
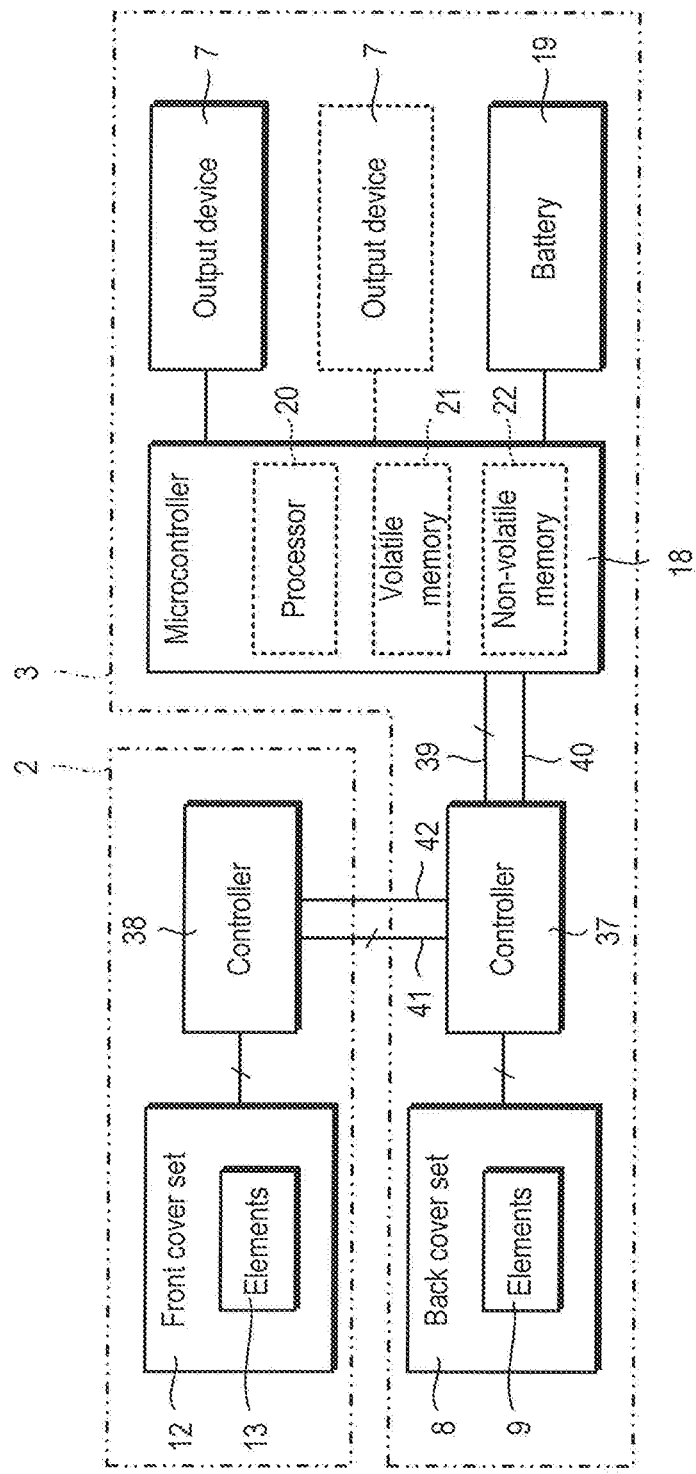
FIG. 10 is a schematic block diagram of capacitive touch elements and a device incorporated into the book shown in FIG. 1.

Referring to FIG. 10, an arrangement for providing connection between the front and back covers 2, 3 is shown.

Each set of the capacitive touch sensing elements 9, 13 is provided with a respective controller integrated circuit (IC) 37, 38 (herein simply referred to as an "interface controller" or simply "controller"). Each controller 37, 38 and associated peripheral components (not shown) form a control circuit. Each control circuit is mounted alongside a respective set of the capacitive touch sensing elements 9, 13. Each controller 37, 38 and associated peripheral components (not shown) may be mounted on a printed circuit board (not shown).

The microcontroller 18 and the controller 37 in the back cover 3 are connected by bus and power lines 39, 40. The controllers 37, 38 are also connected by bus and power lines 41, 42 using a flex connector. A Serial Peripheral Interface (SPI) bus or Inter-Integrated Circuit (I2C) bus can be used as bus system.

This arrangement provides a more robust way of routing data over the spine 4.

The microcontroller 18 runs application software and includes memory 22 containing the sounds and/or speech, and the application software. The microcontroller 18 communicates with the two controllers 37, 38 and monitors what has been touched and where and what page is being touched. The microcontroller 18 can determine where touch involves a single tap, double tap, long hold or swipe or even if the book is closed or open. The microcontroller 18 may have a library or application programming interface for interfacing the microcontroller 18 and controllers 37, 38.

It will be appreciated that many modifications may be made to the embodiment hereinbefore described.

The book can be a work of fiction or non-fiction. The book can be a children's book. The book may include (static) images, such as line art, colour pictures and/or photos. The book may include a significant number of images and few words, i.e. be a picture book.

The book need not output spoken word, but may output non-verbal noises such as animal sounds, the sounds of objects (such as cars) or musical instruments.

The book need not include words. For example, the book may include pictures. Thus, touching a picture may cause the book to output a corresponding sound.

Separate circuits may be included in front and back covers.

The playback device may be provided a physical switch for turning the device on and off.

The same book can be reprogrammed. For example, the book may be provided with an interface or interchangeable non-volatile memory which allows different look-up data and/or different content data to be used. Thus, a book may initially be programmed to output one set of sounds (for example, animal noises) and then be reprogrammed to output another set of sounds (for example, names of the animals).

The book may output a translation of text. Thus, the text may be in one language, for example English, and the controller and output device may output a translation of the text into a second, different language, for example Chinese. The book may include a user interface which allows the user to select the language of translation. For example, the front cover or first page may list a plurality of languages. The user may tap a language and the user's action is detected by capacitive touch elements and interpreted by the microcontroller. The microcontroller may provide output based on the selected language. For example, a look up table can be provided for each language and so the microcontroller can use a look up table for the language selected.

An output device, such as a display, may be provided on a sheet or page which folds out from the cover, for example, so that the output device is positioned next to a page. Such an arrangement can be used for both covers.

The invention claimed is:

1. A book comprising:
   front and back covers;
   a plurality of pages between the covers;
   an array of m×n capacitive touch elements disposed on the inside of a cover configured to provide a touchpad;
   one or more output devices, wherein the one or more output devices include a speaker; and
   a controller operatively connected to the capacitive touch elements and configured:
   to monitor a voltage on each capacitive touch element;
   in response to detecting a change in the voltage on one or more capacitive touch elements, to determine whether a user's digit is stationary or moving based on whether voltages on other capacitive touch elements also change;
   in a case where it is determined that the user's digit is stationary:
      to determine an x,y position of a digit of a user on a page overlaying the cover in dependence upon which capacitive touch elements are actuated; and
      to cause at least one of the one or more output devices to output an audio signal in dependence upon the x,y position;
   in a case where it is determined that the user's digit is moving:
      to determine the x,y position of a digit of a user on a page overlaying the cover in dependence upon which capacitive touch elements are actuated, and to log successive changes in the x,y position of the user's digit; and
      to cause at least one of the one or more output devices to sequentially output audio data corresponding to the logged x,y positions, wherein the controller is configured such that, in a case where successively logged x,y positions correspond to the audio data, that audio data is only output once.

2. A book according to claim 1 comprising:
   a first set of capacitive touch elements disposed on the inside of the back cover for detecting manipulation of a front side of a page; and
   a second set of capacitive touch elements disposed on the inside of the front cover for detecting manipulation of a back side of a page.

3. A book according to claim 1, further comprising at least one interface for outputting the audio signal or the audio data to a remote device.

4. A book according to claim 3, wherein the interface is a wireless interface, such as Bluetooth transmitter or transceiver.

5. A book according to claim 1, wherein the audio signal or the audio data carries a word.

6. A book according to claim 1, wherein the audio signal or the audio data carries a non-verbal sound.

7. A book according to claim 1, wherein the controller is configured, in response to the user continuing to rest at the given position, to repeat the audio signal.

8. A book according to claim 1, wherein the audio signal or the audio data carries a sentence.

9. A method to be performed by a controller of a book comprising front and back covers, a plurality of pages between the covers, an array of m×n capacitive touch elements disposed on the inside of a cover configured to provide a touchpad, and one or more output devices, wherein the one or more output devices include a speaker, the method comprising:
   monitoring a voltage on each capacitive touch element;
   in response to detecting a change in the voltage on one or more capacitive touch elements, determining whether a user's digit is stationary or moving based on whether voltages on other capacitive touch elements also change;
   in a case where it is determined that the user's digit is stationary:
      determining an x,y position of a digit of a user on a page overlaying the cover in dependence upon which capacitive touch elements are actuated;
      causing the at least one of the one or more output devices to output an audio signal in dependence upon the x,y position,
   in a case where it is determined that the user's digit is moving:
      determining the x,y position of a digit of a user on a page overlaying the cover in dependence upon which capacitive touch elements are actuated;
      logging successive changes in the x,y position of the user's digit; and
      causing at least one of the one or more output devices to sequentially output audio data corresponding to the logged x,y positions, wherein the controller is configured such that, in a case where successively logged x,y positions correspond to the audio data, that audio data is only output once.

10. A method according to claim 9, comprising:
    identifying the page.

11. A method according to claim 9, wherein identifying the page comprises measuring signal strength.

12. A non-transitory computer readable medium storing a computer program that, when executed by a playback device comprising an output device, performs a method according to claim 9.

* * * * *